Sept 22, 1925.

H. J. BANTA 1,554,322

PAMPHLET

Filed Aug. 18, 1923

INVENTOR
*Homer J. Banta*
BY
ATTORNEY

Sept. 22, 1925.
H. J. BANTA
1,554,322
PAMPHLET
Filed Aug. 18, 1923 4 Sheets-Sheet 2
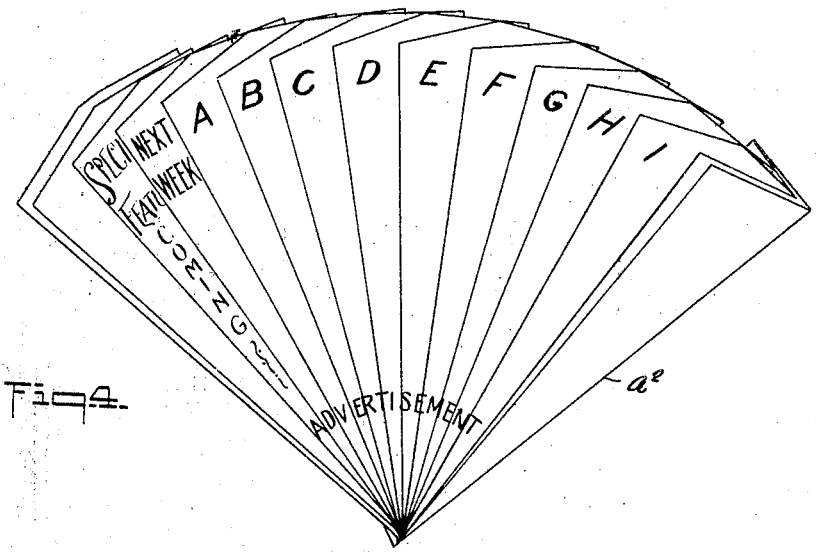
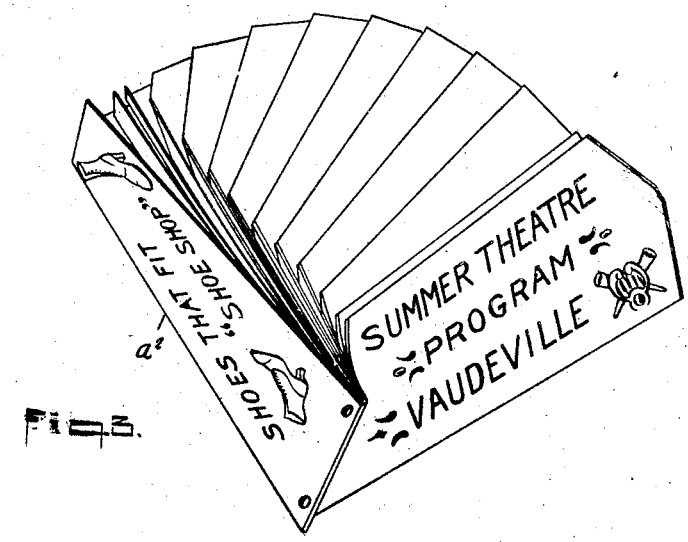
INVENTOR
*Homer J. Banta*
BY
ATTORNEY Sept 22, 1925.
H. J. BANTA
PAMPHLET
Filed Aug 18, 1923     4 Sheets-Sheet 3
1,554,322
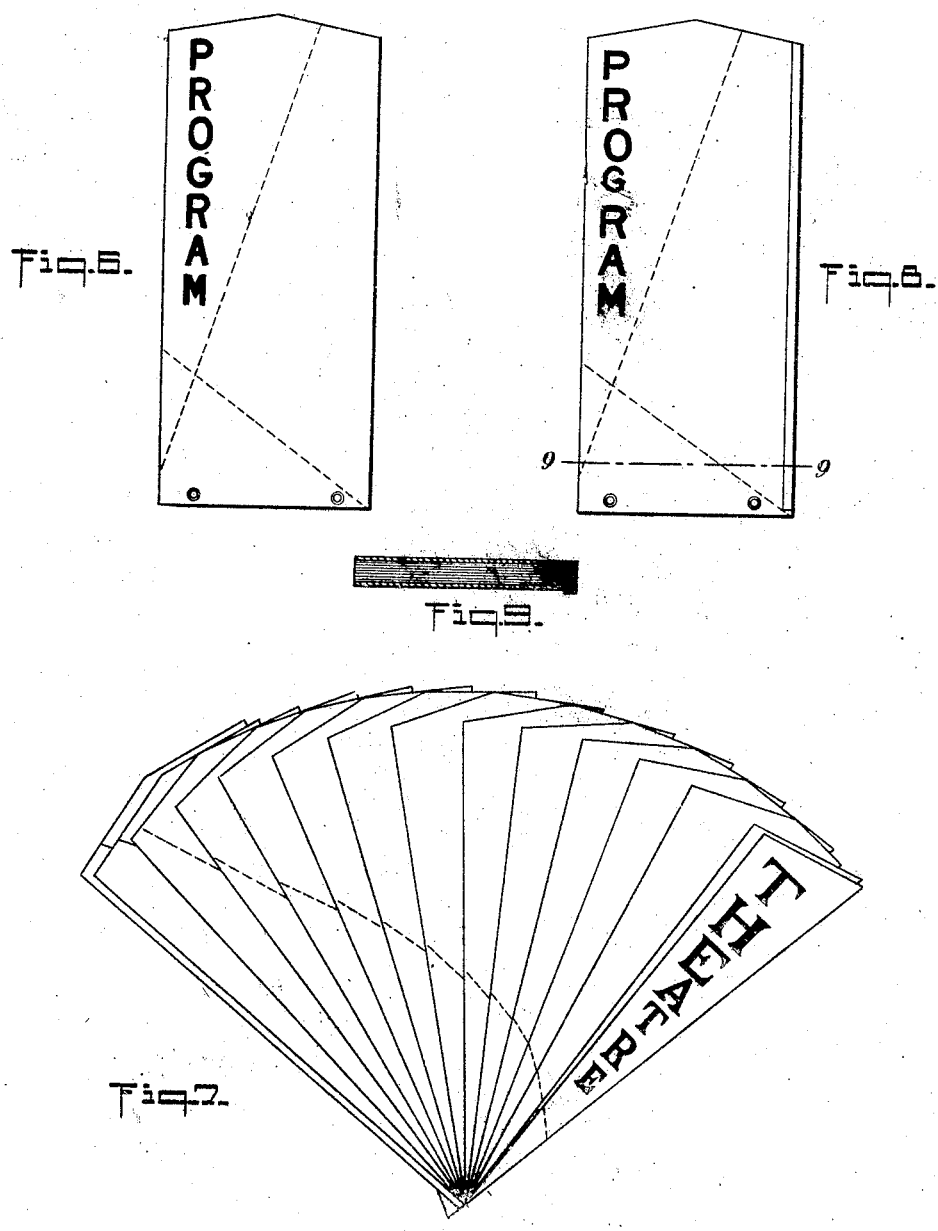
INVENTOR
Homer J. Banta
BY
ATTORNEY Sept. 22, 1925.
H. J. BANTA
PAMPHLET
Filed Aug. 18, 1923      4 Sheets-Sheet 4
1,554,322
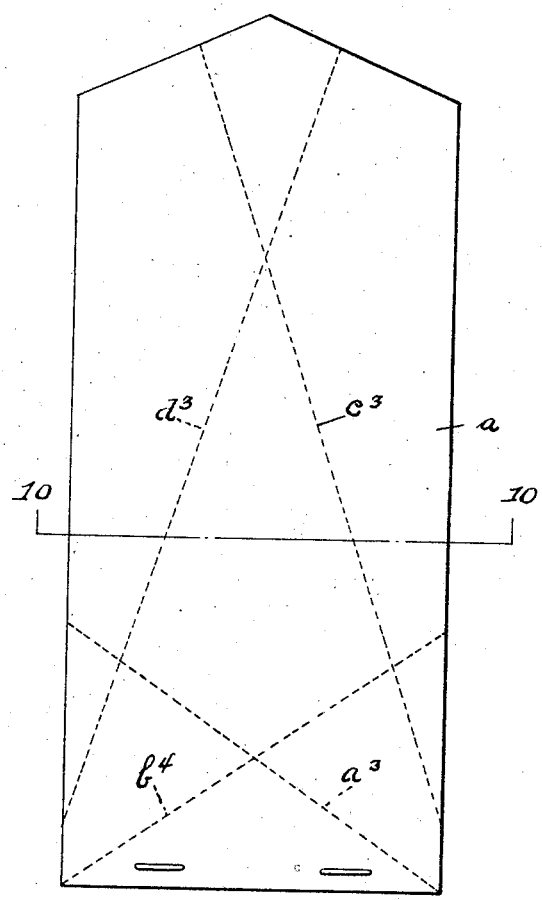

Patented Sept. 22, 1925.

1,554,322

UNITED STATES PATENT OFFICE.

HOMER JESSE BANTA, OF EAST MOLINE, ILLINOIS.

PAMPHLET.

Application filed August 18, 1923. Serial No. 658,195.

*To all whom it may concern:*

Be it known that I, HOMER J. BANTA, citizen of the United States, residing in East Moline, Illinois, have invented certain new and useful Improvements in Pamphlets; and I do hereby declare the following to be a full, clear, and exact description of the invention, such as will enable others skilled in the art to which it appertains to make and use the same.

My invention relates to improvements in pamphlets, and more particularly to structures of this type adapted to be used in ordinary form or manipulated so as to allow the parts to assume positions differing from the normal for the purpose of providing other functions to the pamphlets.

As an example of the general idea of the present invention, I disclose in this application its use as a theatrical program, in which the leaves and covers are connected together at one end so as to allow each leaf to have the general usage of the ordinary leaf, the leaves and covers, however, being foldable so as to produce the equivalent of a fan, the leaves overlapping and the exposed portions of the leaves carrying indications such as an index to the description of the acts corresponding to the index, which description would be covered by the overlapping leaf, or advertising matter contained on such cover portion of the leaf.

Among the objects of my invention are to provide a structure of this type which is simple in construction, readily manipulated, neat and effective in appearance, and which can be manufactured at a relatively low cost.

To these and other ends, the nature of which will be readily understood as the invention is hereinafter disclosed, my invention consists in the improved construction and combination of parts hereinafter fully described, illustrated in the accompanying drawings, and more particularly pointed out in the appended claims.

In the accompanying drawings, in which similar reference characters indicate similar parts in each of the views, Figure 1 is a face view of the pamphlet structure in accordance with my invention and in normal pamphlet condition.

Figure 4 is a view of the pamphlet when entirely unfolded, the view showing the opposite side of the fan.

Figure 5 is a perspective view showing the fan as opened to expose the descriptive matter contained on opposing leaf faces.

Figure 6 is a plan view similar to Figure 1 showing an amplification of the structure of that figure, the fan arrangement being provided by folding in either direction.

Figure 7 is a view similar to Figure 4 showing the structure of Figure 6 in fan form.

Figure 8 is a view similar to Figure 1, showing the addition of a reinforcing strip along one edge.

Figure 9 is a detail sectional view along the line 9—9 in Figure 8.

Figure 10 is a plan view illustrating a further modification of the structure, the fan arrangement being provided by folding in either direction on either of the opposite covers, and Figure 11 is a detail sectional view taken along lines 10—10 of Fig. 10.

For the purpose of illustrating the present invention I have shown it in the form of a theatrical program comprising covers $a$ and leaves $b$, these being preferably of similar configuration and connected at one end by staples or other suitable securing devices $c$, thus forming a pamphlet or book in which the leaves are joined only at the points where the securing devices $c$ pass therethrough.

Figure 1:
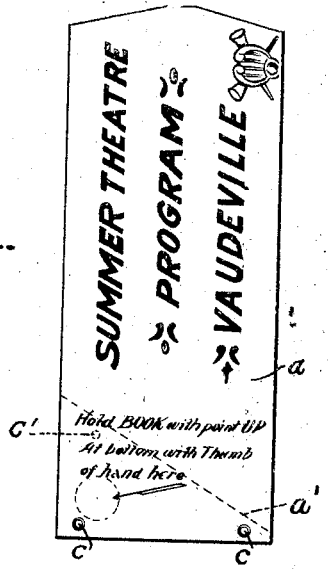

The covers and leaves are preferably elongated, although this is not absolutely essential, and the securing devices are located along one end and preferably at substantially equal distances from the end, although this may be varied, it being possible to place one of the fasteners at a different point, as shown in dotted lines in Figure 1 at $c'$, this change placing the devices at substantially equal distances from the folding line indicated at $a'$ in Figure 1, to which reference is hereinafter made. The latter arrangement is possible where the pamphlet is foldable into fan form only in one direction; where it is to be folded in either direction, as shown for instance in Figures 6 and 7, the devices are secured at substantially equal distance from the end of the pamphlet.

Figure 3:
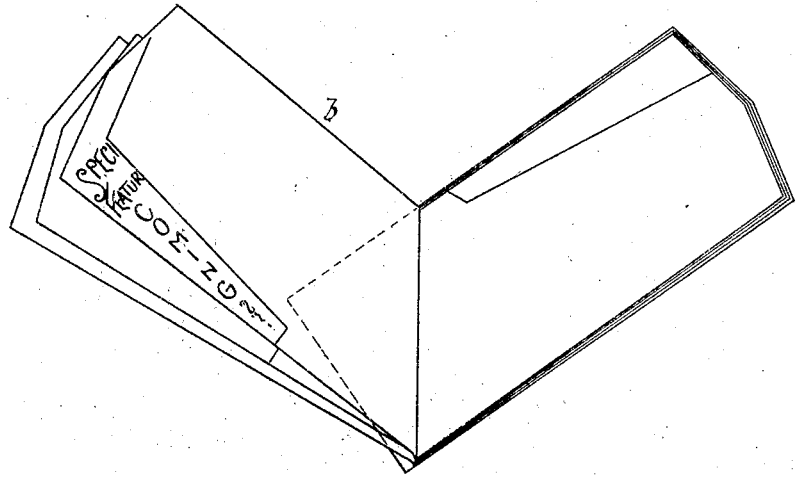
Figure 3 is a perspective view of the structure of Figure 1 partially folded to fan shape.

In the form shown in Figures 1 and 4, the opposite covers are provided with folding lines, these lines differing in the two covers, one cover having the line $a'$, the opposite cover having the folding line $a^2$, shown more particularly in Figures 3 and 4, the folding line $a'$ being the shortest line of folding of the fan, and the cover having this line of fold being adapted to be folded upon itself. The opposite cover has the longest line of fold, extending substantially throughout the length of the cover.

Each of the leaves is also provided with a folding line (which may be a crease), indicated at $b'$, the degree of angularity or inclination of the line relative to the leaf edge changing in each leaf, the difference approximating an equal division of the degree differences of the folding lines $a'$ and $a^2$ of the covers, and the number of divisions depending upon the number of leaves.

By this particular arrangement, it will be readily understood that if the covers are folded on their weakened lines, the leaves will automatically fold in echelon on lines which will provide exposed and covered parts of the leaves, as shown for instance in Figure 4, one leaf overlapping another but being exposed along one edge and where the free end of the pamphlet is given a particular configuration, a portion of the free end of each leaf will also be exposed. The result of this folding is to provide the equivalent of a fan which may be employed by the user for this purpose. In addition, however, there is another important feature in connection with this folding condition, and this is the exposing of a portion of each leaf, which may be employed for the purpose of providing indications such as advertisements which become exposed in this manner, or may be in the form of an index to the matter which is contained on the normally covered portion of the leaf. For instance, in Figure 2, I have shown the leaf as indicating a vaudeville act, entitled "John Doe, the Happy Tramp" the portion indicated at $b^4$ being the exposed portion of the leaf when the pamphlet is in fan form, and carrying an index "G" of the act as possibly announced from the stage. The part indicated at $b^3$ is the part normally covered by the overlapping leaf, and this portion carries the descriptive matter of the act as $b^5$.

Figure 2:
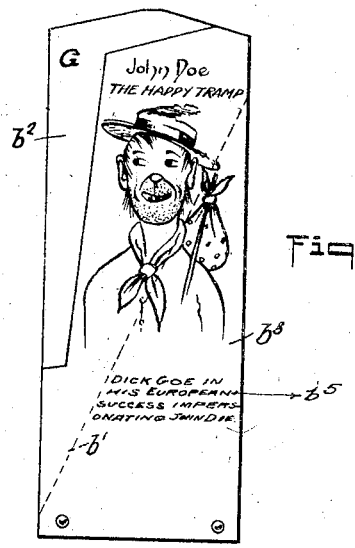
Figure 2 is a face view of one of the leaves of the pamphlet.

The advantage of this particular arrangement will be readily understood for instance by referring to Figures 4 and 2. Assuming that act "G" is the act being produced, the index of this act will appear on the exposed leaf of the fan. When it is desired to ascertain the description of the act, it is necessary only to move the overlapping portion of the fan simply by raising such overlapping portion, whereupon the user can read the description without affecting the general fan arrangement, it being readily understood that as soon as the raised portion is released, it returns to the position shown in Figure 4 so that the fan is serviceable. Likewise all announcements may be similarly provided and also any desirable form of advertising may be placed thereon, the indications both exposed and covered being readily accessible and in a form which will be attractive and readily legible without requiring readjustment of the fan.

Obviously, when the pamphlet is in normal condition, it is of a size and form which can be easily carried, being always ready for use as a fan. If desired, the pamphlet may be arranged to be folded into fan form in either direction, in which case each cover is provided with the folding lines $a'$ and $a^2$, as shown in Figure 6, and each leaf is similarly provided with two folding lines differing, of course, in angularity, as heretofore explained, in order that in folding the fan effect may be produced. The principle of the invention may be carried still further, as exhibited in Figure 10, wherein each cover has four folding lines $a^3$, $b^4$, $c^3$, and $d^3$ and each leaf has a corresponding number of folding lines. This permits to be folded into fan form to the right or left from either cover.

If desired, one edge of the cover may be provided with a reinforcing strip of paper or other suitable material, indicated at $d$ in Figures 8 and 9, this giving greater rigidity to the structure as an entirety. This, however, is not absolutely essential.

Some of the advantages of this general arrangement have been referred to, and in addition it may be added that inasmuch as the general construction of the pamphlet does not differ from the ordinary structure, the increased cost of production is small, being simply the forming of the folds in the covers and leaves, these being provided in advance in order that the pamphlet will, upon application of pressure at one point, automatically pass into fan form thus exposing the index to the entire contents without requiring the turning of separate leaves, and at the same time make the pamphlet usable as a fan, in which condition the description of the acts is readily accessible without manipulation of a character which would necessitate the change in the fan form.

While I have herein shown and described several ways in which my invention may be carried into effect, it will be readily understood that changes and modifications therein may be required or desired to meet the exigencies of use or individual desires, and I therefore desire it to be understood that I reserve the right to make any and all such changes or modifications as may be found necessary or desirable in so far as the same may fall within the spirit and scope of the invention and expressed in the accompanying claims.

What I claim is:

1. A pamphlet comprising a plurality of leaves each having a line of fold inclined to the leaf edge, the relative position of said lines combinedly providing an overlapping of leaves radiating from a common center, with portions of leaves exposed.

2. A pamphlet comprising a plurality of leaves each having a line of fold, the relative positions of said lines combinedly providing an overlapping of leaves radiating from a common center, with portions of leaves exposed, the lines of fold being inclined relative to the direction of length of the leaf.

3. A pamphlet comprising a plurality of leaves each having a line of fold, the relative positions of said lines combinedly providing an overlapping of leaves radiating from a common center, with portions of leaves exposed, the lines of fold being inclined relative to the direction of length of the leaf, the degree of inclination differing in adjacent leaves.

4. A pamphlet comprising covers and leaves secured at one end and each having a line of fold inclined to the edge of the leaf or cover and differing in inclination from the line of fold of an adjacent leaf or cover.

5. A pamphlet comprising covers and leaves secured at one end and each having a line of fold inclined to the leaf edge and differing in inclination from the line of an adjacent part, the differences being progressive in successive leaves.

6. A pamphlet comprising covers and leaves secured at one end and each having a line of fold inclined to the leaf edge and differing in inclination from the line of an adjacent part, the differences being substantially progressive and of substantially similar degree in successive leaves.

7. A pamphlet having its leaves secured at one end and each having a line of fold said leaves being foldable to a fan-like structure on such lines of fold.

8. A pamphlet having its leaves secured at one end and foldable to a fan-like structure on lines of fold, each leaf having two independent lines of fold to permit folding in either direction.

9. A pamphlet comprising leaves connected at one end, said leaves each having a line of fold inclined to the leaf edge, the leaves being combinedly movable to expand the folds substantially simultaneously, said leaves, in folded position, providing overlapping and exposed portions of each of the leaves.

10. A pamphlet comprising leaves connected at one end, said leaves each having a line of fold inclined to the leaf edge, the leaves being combinedly movable to provide the folds substantially simultaneously, said leaves, in folded position, providing overlapping and exposed portions to each of the leaves, said exposed portions carrying indicia for indicating the contents of the unexposed portions of the leaves.

11. A pamphlet comprising leaves connected at one end, said leaves each having a preformed line of fold inclined to the leaf edge, the leaves being combinedly movable to provide the folds substantially simultaneously, said leaves, in folded position, providing overlapping and exposed portions of each of the leaves, said exposed portions carrying indications forming individual indexes to the covered portions of the leaves.

12. A device for the purpose described, comprising a plurality of elongated leaves connected together along one of their short sides, each leaf having a straight crease at an acute angle to one of the long sides, the angle increasing regularly from leaf to leaf.

13. A device for the purpose described, comprising a plurality of elongated leaves connected together along one of their short sides, each leaf having a straight crease at an acute angle to one of the long sides, the angle increasing regularly from leaf to leaf, said leaves being movable upon a common center into fan-like form.

14. A pamphlet comprising leaves and covers secured at one end and foldable to a fan-like structure on preformed lines of fold, each leaf and each cover having a plurality of independent lines of fold to permit folding to the right or left with respect to either cover.

In testimony whereof, I affix my signature.

HOMER JESSE RANTA